United States Patent [19]

Shimada et al.

[11] Patent Number: 4,751,519

[45] Date of Patent: Jun. 14, 1988

[54] RECIPROCATING RECORDING PAPER IN RECORDING APPARATUS

[75] Inventors: Mitsuhiro Shimada, Nara; Yuichiro Mori; Takashi Imagawa, both of Yamatokoriyama; Fumio Shiozaki, Tenri; Susumu Nonaka, Yamatokoriyama, all of Japan

[73] Assignee: Sharp Kabushiki Kaisha, Osaka, Japan

[21] Appl. No.: 910,018

[22] Filed: Sep. 22, 1986

[30] Foreign Application Priority Data

| | | | |
|---|---|---|---|
| Sep. 25, 1985 | [JP] | Japan | 60-214183 |
| Sep. 25, 1985 | [JP] | Japan | 60-214184 |
| Sep. 25, 1985 | [JP] | Japan | 60-214185 |
| Sep. 25, 1985 | [JP] | Japan | 60-214186 |
| Sep. 25, 1985 | [JP] | Japan | 60-214187 |
| Sep. 25, 1985 | [JP] | Japan | 60-214188 |
| Sep. 25, 1985 | [JP] | Japan | 60-214189 |

[51] Int. Cl.$^4$ .......... G01D 15/10

[52] U.S. Cl. .......... 346/76 PH; 219/216; 346/138

[58] Field of Search .......... 346/106, 76 PH; 219/216 PH; 400/120, 240, 240.3, 240.4, 224.2

[56] References Cited

U.S. PATENT DOCUMENTS

| | | | |
|---|---|---|---|
| 4,511,242 | 4/1985 | Ashbee et al. | 355/14 |
| 4,517,590 | 5/1985 | Nagashima et al. | 346/76 PH X |
| 4,532,525 | 7/1985 | Takahashi | 346/76 PH |
| 4,614,950 | 9/1986 | Ito | 346/76 PH |
| 4,667,208 | 5/1987 | Shikari et al. | 346/76 PH |

FOREIGN PATENT DOCUMENTS

| | | |
|---|---|---|
| 0116187 | 8/1984 | European Pat. Off. . |
| 3435740 | 4/1985 | Fed. Rep. of Germany . |
| 3537572 | 4/1986 | Fed. Rep. of Germany . |
| 2100673 | 1/1983 | United Kingdom . |

*Primary Examiner*—A. D. Pellinen
*Assistant Examiner*—Morris Ginsburg
*Attorney, Agent, or Firm*—Birch, Stewart, Kolasch, & Birch

[57] ABSTRACT

According to the recording apparatus of the present invention, recording papers are wound by the winding member while the end portions of the recording papers are tightly held. The recording papers can therefore be correctly reciprocated. Furthermore, before recording is effected by the recording head, the recording papers are one wound back by the winding member to an initial position, thereby removing strains or deflections of the recording papers. Also, in the case of a color printer of thermal transcription, images in each of the four colors can be accurately overlapped without disagreement.

10 Claims, 9 Drawing Sheets

RECIPROCATING RECORDING PAPER IN RECORDING APPARATUS

BACKGROUND OF THE INVENTION

The present invention generally relates to a recording apparatus which is provided with a paper winding means for winding recording papers while holding end portions of the recording papers, and more particularly to a recording apparatus featuring control of transfer of the recording papers.

Generally, in the case that a plurality of recording operations are done for a single recording paper, it is necessary to repeatedly reciprocate the recording paper over a recording head. For example, in a color printer of thermal transcription, a recording paper, when thermally transcribed or transferred with four ink films, (for example, yellow, magenta, cyan and black ink films) is required to reciprocate correctly in order to prevent the transcribed image on the recording paper from being out of coincidence in colors, etc. However, in a prior art color printer of the above-described type, particularly when the recording is effected on a general recording paper in the form of a sheet without sprocket holes formed therein, it is difficult to reciprocate correctly the recording paper.

On the other hand, there is another kind of recording apparatus which performs recording while it transfers a recording paper in the forwarding direction and in the returning direction, to be employed in the case that a picture image or the like is to be recorded on the recording paper. For example, it is necessary in a color printer of thermal transcription to transfer four inks, namely, yellow, magenta, cyan and black sequentially, onto the recording paper. If sheets of recording papers smaller than a predetermined size are put in the prior art color printer of thermal transcription, however, rear ends of the recording papers are detached from a platen when the first color is transferred, and therefore the recording papers will remain in the color printer and cannot be properly discharged.

Further, in the case where the recording papers are reciprocated many times in order to record a colored picture image onto the recording papers, it is required, for example, in the color printer of thermal transcription, to record four colors onto each of the recording papers by using four transfer films of yellow, magenta, cyan and black. In such a case as above, the recording papers should be correctly reciprocated so as not to give rise to disagreement in overlapping of the colors. Also, when an X-Y plotter using a platen is employed, it is necessary to reciprocate the recording papers in such a manner as not to miss the position. It has been difficult for the X-Y plotter to correctly reciprocate the recording papers only by the rotary movement of the platen when the recording papers are normal sheets of papers without sprocket holes.

Although ways to transfer the recording papers while a part of the papers are held have been proposed, a fear remains that the recording papers might be wrinkled or deflected if they are not securely held.

As has been described above, the prior art color printer of thermal transcription performs transferring of each color, with the use of tapes applied with four thermal transcription inks, i.e., yellow, magneta, cyan and black thermal transcription inks, onto a recording paper. The compiling of these four colors will result in a desired picture image. Therefore, in such a case as described above where the thermal transcription is carried out many times on the same portion of the recording paper, the thermal transcription ink is transferred onto the recording paper in the middle of the reciprocal transfer of the recording paper.

However, when the transferring direction of the recording papers is reversed, if the thermal transcription ink transcribed immediately before the reversal is not completely fixed or dried, undesirable slipping or blurring of the transcribed image at that portion may take place.

Recording papers should not be out of position relative to a transferring means for transferring the recording papers. Moreover, in the color printer of thermal transcription or the like in which another image is overlapped onto the already-formed image for recording, both images should not be slipped or blurred relative to each other. According to the prior art recording apparatus, however, it could not be prevented that the recording papers are deflected when the transferring direction of the recording papers is reversed, and also the images to be overlapped with each other could not be correctly overlapped.

Meanwhile, general printers are designed to transfer recording papers while maintaining balance with the platen. By way of example, a guide plate is provided for balancing or a roller is placed so as to control timing of the start of transfer of the recording papers. After the recording papers are pressed into contact with this roller, they are transferred. Nevertheless, in some cases, recording papers are transferred to the platen out of balance due to the existence of difference in thickness or deflections. In such cases, not only the recorded images are inclined, but wrinkles or creases result and the recorded images are disturbed, resulting in jamming of recording papers. The jammed recording papers cannot be used again. Moreover, it is difficult and troublesome to remove the jammed recording papers. Especially in the case where a single recording paper is reciprocated many times for recording, such as in the case of the color printer of thermal transcription, etc., it is highly desirable to transfer the recording paper while maintaining strict balance of the paper with the platen.

SUMMARY OF THE INVENTION

Accordingly, the present invention has been developed a substantially eliminate the above-described disadvantages or inconveniences inherent in the prior art recording apparatuses, and has for its essential object to provide an improved recording apparatus in which recording papers are correctly reciprocated to improve positioning accuracy of recorded images on the recording papers.

A second object of the present invention is to provide an improved recording apparatus of the type referred to above which can prevent recording papers from being loosely separated from a platen even when the recording papers are smaller than a predetermined size.

A third object of the present invention is to provide an improved recording apparatus of the type referred to above in which the recording papers can be transferred to remain in position without slipping, or without bringing about wrinkles or strains.

A fourth object of the present invention is to provide an improved recording apparatus of the type referred to above in which recording papers can be correctly reciprocated, without wrinkles or strains being generated, to improve positioning accuracy of recorded images on the recording papers.

A fifth object of the present invention is to provide an improved recording apparatus of the type referred to above which can prevent an image transcribed on a recording paper immediately before the transferring direction of the recording paper is reversed from being slipped.

A sixth object of the present invention is to provide an improved recording apparatus of the type referred to above which, when recording papers are reciprocated for recording, can correctly adjust the recording starting position of the recording papers.

A seventh object of the present invention is to provide an improved recording apparatus of the type referred to above which can detect the fact that recording papers are transferred out of balance to a portion such as a platen in the color printer of thermal transcription, thereby preventing the recorded images from being disturbed and avoiding jamming of the recording papers.

In accomplishing these and other objects, according to the present invention, a recording apparatus comprises a paper winding member which winds recording papers while holding end portions of the recording papers, a recording head for recording onto the recording papers when the recording papers are wound by the paper winding member, a rewinding member which rewinds the recording papers wound by the winding member after the completion of recording, and an empty transferring means which operates the winding member, without driving the recording head, to wind back recording papers which have not been recorded, and then operates the rewinding member to transfer the recording papers without recording. According to the recording apparatus of the present invention, since the recording papers are wound by the winding member while the end portions of the recording papers are tightly held, the recording papers can be correctly and precisely reciprocated. Furthermore, before recording is effected by the recording head, the recording papers are once wound back by the winding member to an initial position, thereby removing strains or deflections of the recording papers. Accordingly, in the case of a color printer of thermal transcription, images in each of the four colors can be accurately overlapped without disagreement.

The recording apparatus includes a platen provided opposite to the recording head for transferring recording papers at least in the returning direction and a transferring means for transferring the recording papers at least in the forwarding direction. The recording papers are thus reciprocated by the platen and the transferring means. At the same time, a paper detection sensor is provided before the platen so as to detect rear ends of the recording papers. When the paper sensor detects the rear end of a recording paper while the recording paper is being transferred in the forwarding direction, the transfer of the recording paper is stopped by a stopping means. Accordingly, the rear end of the recording paper is never detached from the platen which in turn transfers the recording paper in the rewinding direction to discharge the paper outside.

In addition to the above, the recording apparatus of the present invention further includes a paper detection sensor provided in the vicinity of the platen, which detects front ends of the recording papers, and a control means for controlling the transferring amount of the recording paper. When the paper detection sensor detects the front end of a recording paper, the control means orders the platen to transfer the recording paper from the position of the paper detection sensor to the position where the winding member holds the front end of the recording paper.

Because of the above-described structure, front ends of the recording papers can be correctly advanced to the position where the paper winding member holds them. Accordingly, the winding member is able to hold the appropriate number of front ends of the recording papers at all times.

According to the present invention, a rotary drum for transferring the recording papers both in the forwarding direction and in the rewinding direction is driven by a pulse motor, the rotating speed of which is determined by pulse control. The platen is driven by a non-pulse motor or a non-synchronous motor so that the platen can apply tensile force to the recording papers transferred by the rotary drum either in the forwarding direction or in the rewinding direction. When the rotary drum transfers the recording papers in the forwarding direction, the recording papers are, since pressed by the recording head against the platen, applied with tensile force by the transferring force of the rotary drum in the forwarding direction. On the contrary, when the recording papers are transferred in the returning direction, the platen is given such rotational torque as to transfer the recording papers in the returning direction, and the transferring speed of the platen is controlled by the rotary drum through pulse control, so that the recording papers can be transferred while being applied with adequate tensile force. In the manner as described above, according to the present invention, the recording papers can be transferred in any of the forwarding direction and returning direction, without generation of deflections or strains, and therefore an image can be recorded in position onto the recording paper.

Further, the recording apparatus of the present invention is equipped with a contact means which brings a thermal transcription ink tape into contact with the recording paper over a predetermined distance during the transfer of the paper. A suspending means is also provided in the recording apparatus of the present invention which suspends the transfer of the recording paper for a fixed period of time when the transferring direction of the recording paper is reversed.

In accordance with the present invention, since the image thermally transcribed immediately before the transferring direction of the recording paper is reversed is held in contact with the ink tape for a given period of time, the image is completely fixed within the time period. Thus, the transcribed image can be prevented from being slipped, which would be brought about by the reversal of the transferring direction of the recording papers in the prior art recording apparatus.

After a home position detection means detects the home position of the transferring means described earlier which transfers the recording papers in the forwarding direction for recording, a transfer control member drives the transferring means a specific distance further away from the home position in the returning direction. Therefore, even if the recording paper is deflected when it is returned in the returning direction by the transferring means, the deflections are already removed at the starting time of recording which is carried out after the transferring means has reached the home position. Thus, the recording papers can be arranged accurately at the starting position of recording. If the home position detection means is arranged to detect the home position with some room, errors by an insensitive area of the sensor can be removed in the manner that recording is always started at the beginning of the end of the home position.

The transferring means described above is generally comprised of a paper feeding material and a paper transferring passage. At least two paper detection sensors are put in the widthwise direction of the recording paper in the middle of the transferring passage. The balance of the recording papers with respect to the paper feeding material is detected by the difference of timing between signals generated by the two detection sensors. Accordingly, in the case that a front end of the recording paper is transferred out of balance to the position where the detection sensors are placed, a time difference or a distance difference is brought about in detection timing among detection sensors. If this timing difference is beyond a given permissible range, it can be so detected that the recording paper is not transferred in balanced condition. Therefore, the balance of the recording papers can be detected before they reach the feeding material such as the platen, thereby to prevent that the recording papers are started to be recorded out of balance. Moreover, the permissible range of the balance of the recording papers can be adjusted depending on the conditions of the detection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with one preferred embodiment thereof with reference to the accompanying drawing, in which.

DETAILED DESCRIPTION OF THE EMBODIMENT

Figure 1:
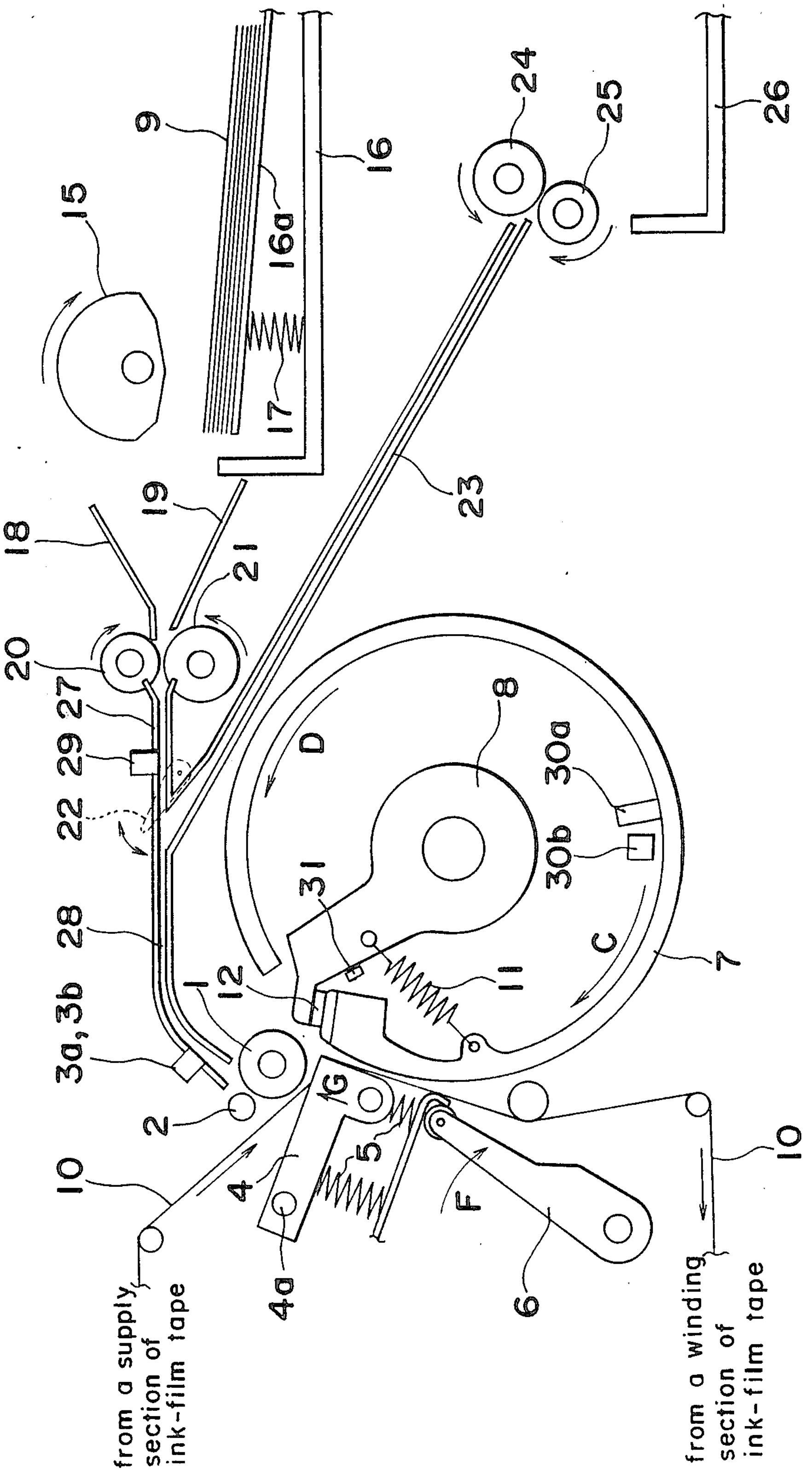
FIG. 1 is a view showing the construction of a color printer of thermal transcription equipped with a paper transferring device according to the preferred embodiment of the present invention.

Before the description of the present invention proceeds, it is to be noted here that like parts are designated by like reference numerals throughout the accompanying drawings.

Referring to FIG. 1, there is shown the construction of a color printer of thermal transcription equipped with a paper transferring device according to one preferred embodiment of the present invention. The color printer of the present invention includes a paper feeding cassette 16 which has a paper platform **16*a* for placing recording papers 9 thereon in layers. A spring 17 pushes the platform 16*a* upwards in such a manner as to maintain the height of the layered papers 9 approximately constant. When a paper feeding roller 15 makes one clockwise rotation, the uppermost of the layered papers 9 is discharged. The discharged paper is then led by a pair of guides 18 and 19 towards feeding rollers 20 and 21. A guide element 22 is pivoted to extend approximately in a horizontal direction when the paper is fed by rollers 20, 21. Accordingly, the paper is transferred by the feeding rollers 20 and 21 along transferring passages 27 and 28. In order to detect the condition of the transfer of the papers, there are provided paper detection sensors 29, 3*a* and 3*b* (referred to only as a paper sensor hereinbelow) which are photo-sensors of reflection type. A bail roller 2 is opposed to a platen roller 1 (referred to as a platen hereinbelow). The rotation in the counterclockwise direction of the platen 1 sends out the recording papers towards a drum 7**.

An ink film tape 10 supplied from a supply part is sent to a winding part. A thermal head 4 is supported by a supporting shaft **4*a*. When a lever 6 is moved in the F direction, the thermal head 4 is moved in the G direction through a supporting spring 5. In consequence to this, the thermal head 4 presses the ink film tape 10 and the recording paper 9 against the platen 1**.

The drum 7 is connected to a clamp 8 through a spring 11. Although the clamp 8 is rotated concurrently with the rotation of the drum 7, when the drum 7 is rotated in the counterclockwise direction (in the D direction), the clamp 8 is put into contact with a stopper 31 secured to the body of the color printer, and therefore the position of the clamp is not changed, with the spring 11 being stretched by the drum 7. Accordingly, a paper holder member 12 is brought into an opened condition. Under this condition as above, when the drum 7 is rotated in the clockwise direction (in the C direction) after an end of the paper is sent out by the platen 1 to the holder member 12, the end of the paper is held by the tensile force of the spring 11 and the paper itself is wound into the circumference of the drum 7. At this time, the ink film tape 10 is sent out in synchronous relation to the feeding speed of the recording paper, and the thermal head 4 is driven, and then the recording paper is recorded with a desired information. Afterwards, the lever 6 is driven in the direction opposite to the F direction, thereby to detach the thermal head 4 from the platen 1. The platen 1 is applied with rotational torque in the clockwise direction, and the drum 7 is rotated in the counterclockwise direction, so that the recording paper is returned to its initial position for repetition of the foregoing recording operation. It is to be noted here that the guide element 22 is held at the position as shown in FIG. 1 and the recording paper is returned along the transferring passage 28 towards a transferring passage 23. If the recording paper wound around the drum 7 is required to be discharged, the drum 7 should be rotated in the counterclockwise direction until the paper holder member 12 is brought into an opened state. As a result, the recording paper is separated from the drum 7, which paper is then discharged to a discharge tray 26 by discharge rollers 24 and 25.

Figure 2:
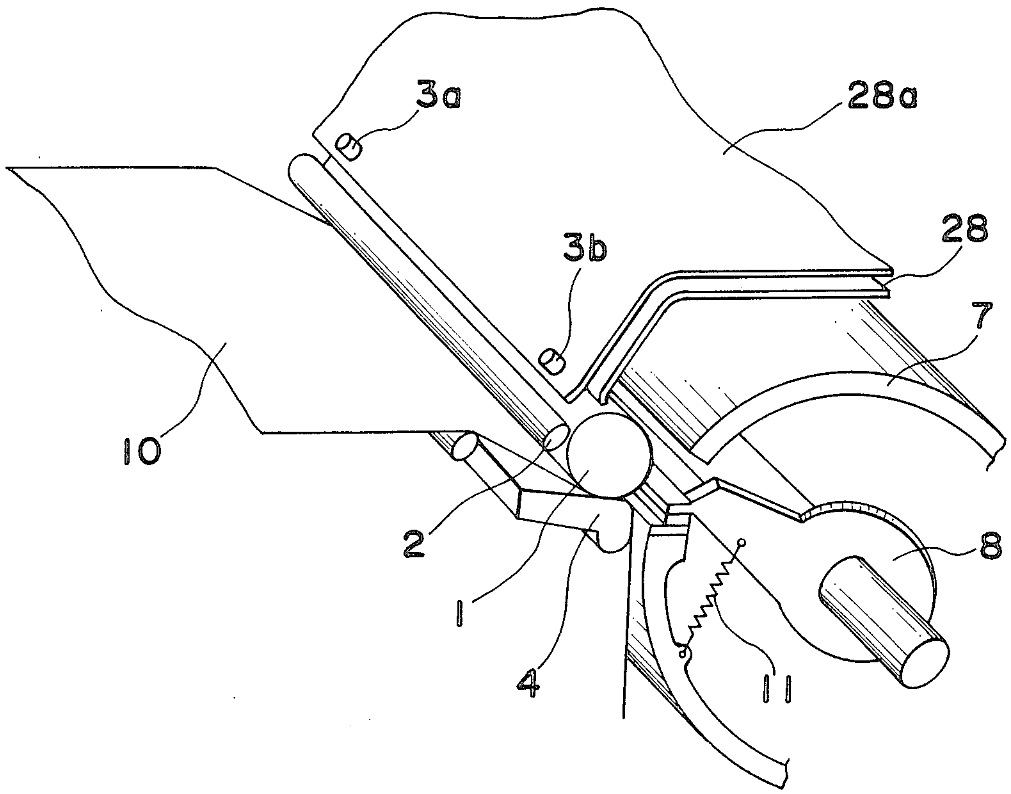
FIG. 2 is a perspective view showing the portion where a paper sensor is installed in the color printer of thermal transcription of FIG. 1.

Referring to FIG. 2 showing an essential portion of the color printer of FIG. 1, paper sensors 3*a* and 3*b* are found adjacent to the platen and the bail roller 2 in the vicinity of an end portion of an upper guide plate 28*a* constituting the transferring passage 28. When the recording paper led to the platen 1 through the transferring passage 28 passes the paper sensors 3*a* and 3*b*, specifically, a front end of the recording paper passes the sensors 3*a* and 3*b*, the sensors operate to detect the presence of the recording paper. If the timing to detect the paper by each sensor is within predetermined period of time, it represents that the recording paper is transferred in proper alignment. And the recording paper is, while the end of the paper is held between the platen 1 and the bail roller 2, continued to be transferred. On the contrary, when the timing to detect the paper by each sensor is different over the predetermined period of time, the transfer of the recording paper is interrupted before the platen 1 and the bail roller 2 holds the paper therebetween. Thus, transferring recording paper which is out of alignment can be avoided.

Figure 3:
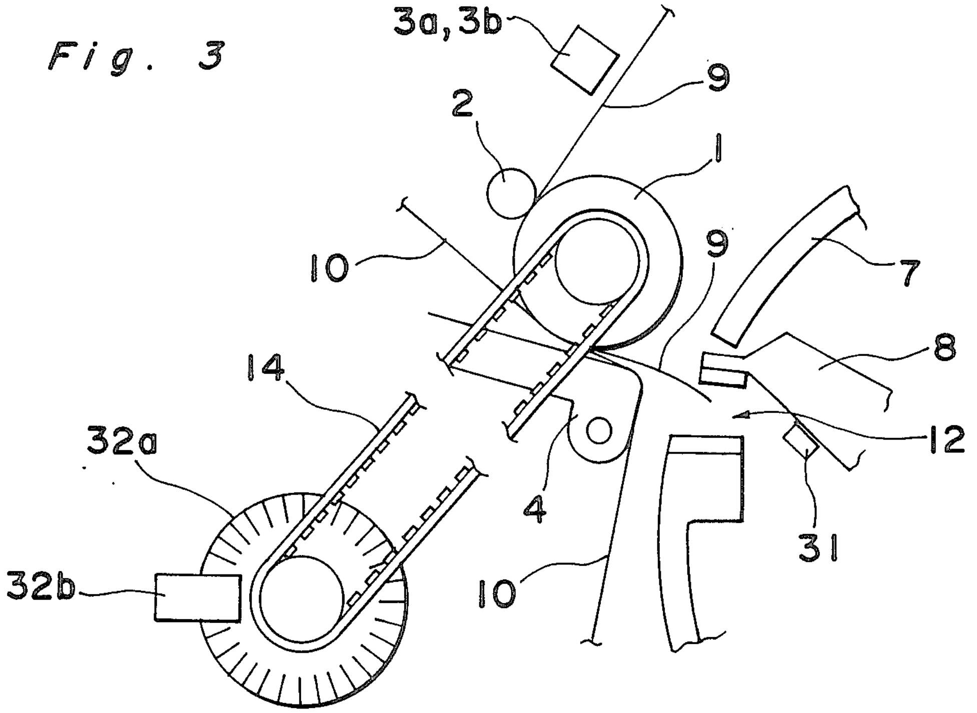
FIG. 3 is a view showing the construction around a paper holder part of the color printer of FIG. 1.

FIG. 3 shows the structure of the holding member 12 when the recording paper is held by the platen 1 and the drum 7 is in a position wherein the clamp 8 engages stopper 31. As shown in FIG. 3, the platen 1 is connected to a slit disk 32*a* through a timing belt 14. A permeable photosensor 32*b* detects slits of the slit disk 32*a* and counts the rotating amount of the platen 1 as the number of pulses. When the platen 1 is rotated in the counterclockwise direction until the number of pulses counted by the photosensor 32*b* reaches a predetermined value after the end of the recording paper 9 is detected by the sensors 3*a* and 3*b*, the end of the recording paper 9 is forwarded to the paper holder member 12 as shown in FIG. 3. In this case, the transferring speed of the recording paper by the platen 1 and the bail roller 2 is approximately equal to the transferring speed by the rollers 20 and 21.

Figure 4:
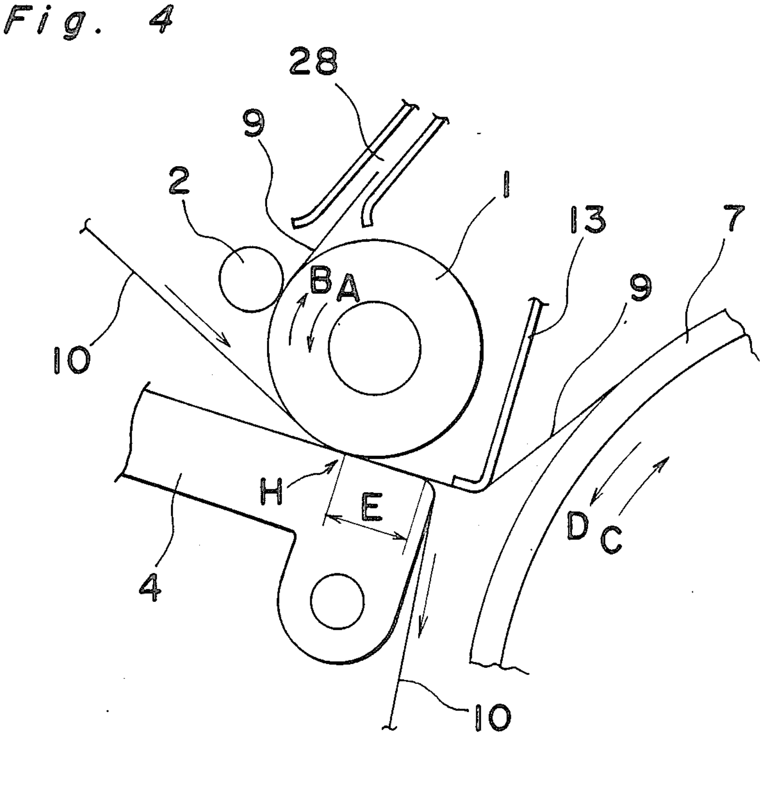
FIG. 4 is a view showing the construction of a platen, a thermal head and their neighborhood of the color printer of FIG. 1.

In FIG. 4, the structure of the platen 1 and the thermal head 4 and their neighborhood is illustrated. During a normal recording operation, the recording paper 9 is transferred in the manner that the drum 7 is rotated in the clockwise direction (in the C direction). At the same time, the ink film tape 10 is sent in the direction shown by an arrow in synchronous relation to the transferring speed of the recording paper 9. At this time, the platen 1 is rotated, in accordance with the transfer of the paper 9, in the A direction. It is so arranged that the recording paper 9 and the ink film tape 10 are transferred in contact with each other over the distance E. The thermal head 4 is formed with a heating element at the position H. During the transfer of the recording paper 9 and the ink film tape 10, by driving the thermal head 4, the ink of the ink film tape 10 at the position H is melted, starting the transcription onto the recording paper 9. The ink is transcribed onto the paper 9 during the transfer of the paper and is finally fixed on the paper 9 before this paper and the ink film tape 10 travel the distance E.

After one scene has been recorded on the recording paper 9 in the above-described manner, in the case that another colored image is desired to be transcribed on the paper 9, it is necessary to return the recording paper 9 to the initial position. However, before the recording paper is returned to the initial position, it is so arranged that the recording paper 9 is temporarily stopped for a time, e.g., 100–300 msec., which is a time period for the recording paper 9 to be transferred over the distance E. Thereafter, the thermal head 4 is detached from the platen 1 which is then applied with rotational torque in the clockwise direction (in the B direction). The drum 7 is rotated in the counterclockwise direction (in the D direction) so that the recording paper 9 is returned to the initial position. Thus, in the manner as described above, since the transfer of the recording paper 9 is temporarily stopped when the transferring direction of the paper is reversed, the image transcribed when the recording paper is transferred the distance E is completely fixed onto the recording paper. Therefore, no slippage is observed in the transcribed image in this portion at all. Moreover, since the transfer is temporarily stopped while the ink film tape 10 is in contact with the recording paper, the thermal head 4 can be driven immediately before the rear end of the recording paper is detached from the platen 1 and the bail roller 2. Accordingly, even in the case where sheets of recording papers are employed, an image can be formed even near the rear ends of the papers. It is to be noted that a paper guide 13 shown in FIG. 4 is omitted in FIG. 1.

Figure 5:
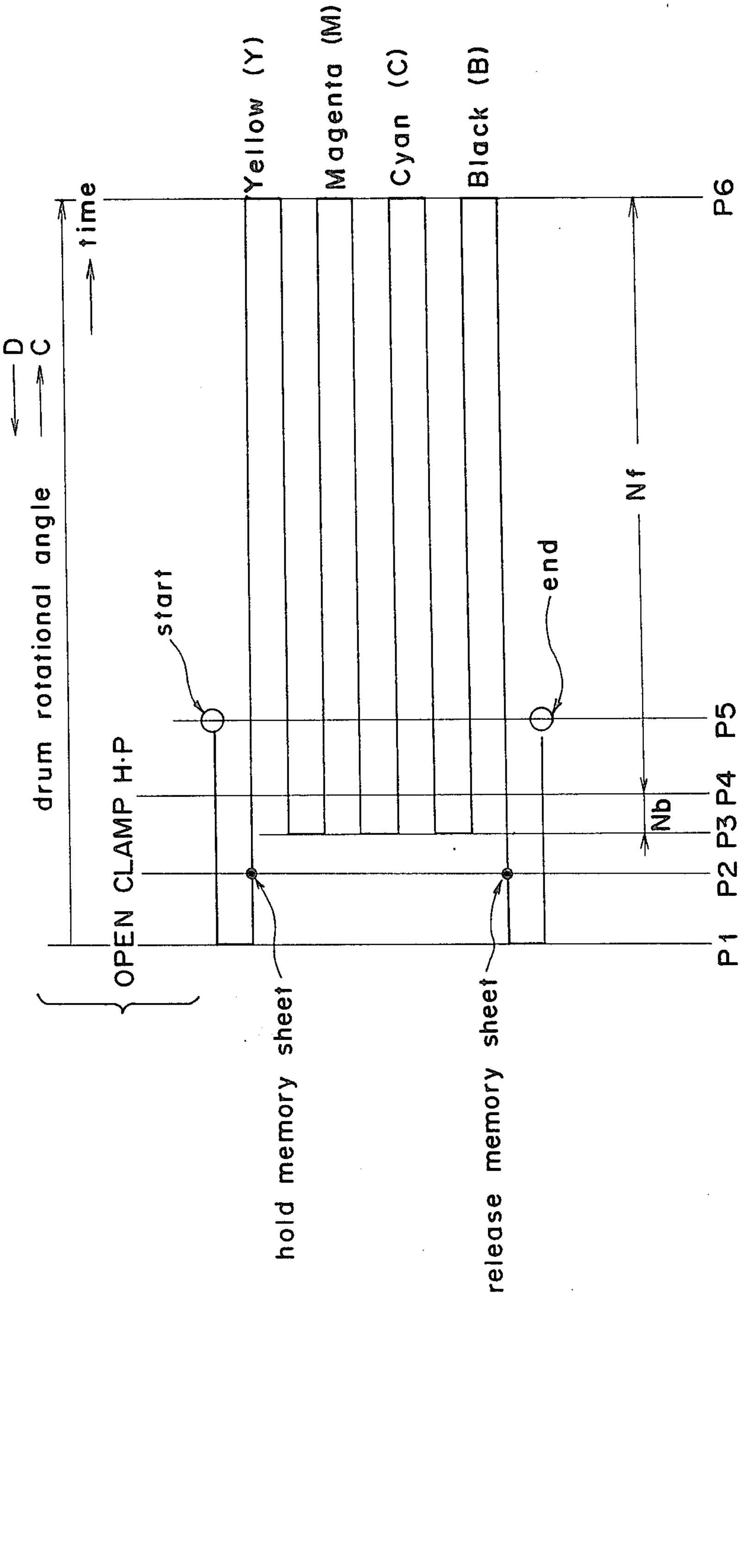
FIG. 5 is a diagram showing the sequence of control of the rotation of a drum of the color printer of FIG. 1.

The diagram shown in FIG. 5 represents the sequence of control of rotation of the drum 7. P1 is a position where the drum 7 is stopped after it is rotated most in the counterclockwise direction (in the D direction) and also a position where the paper holder member 12 is opened. P2 is a position where the paper holder member holds the recording paper, with the drum 7 being rotated in the clockwise direction (in the C direction) from P1. P4 is a position where the drum 7, after being further rotated in the clockwise direction, reaches its home position. From this position P4, the thermal head 4 is operated to start thermal transcription. First, the drum 7 is rotated in the clockwise direction to a position P6, with a yellow ink film employed. The rotation of the drum 7 from the home position P4 to the position P6 is carried out while the pulse motor for driving the drum 7 is driven by a predetermined number of steps Nf. Then, the drum 7 is stopped at a position P3 passing through the home position P4, which takes place in the middle of the process to return the recording paper 9 by the rotation of the drum in the counterclockwise direction. The position P3 is far from the home position P4 over the distance (angles) corresponding to the number of steps of the pulse motor, that is, Nb. Subsequently, the drum is rotated in the clockwise direction to the position P4, when the thermal head 4 is driven to perform the thermal transcription of magenta. By repeating the aforementioned sequence of operations, the transcription of each of cyan and black is also carried out. When the drum 7 reaches the position P6 after the transcription of black, the drum 7 is rotated in the counterclockwise direction to the position P2 where the paper holder member 12 begins to be opened. Then, when the drum 7 is rotated to the position P1, the holder member 12 is perfectly and completely opened. Thereafter, the drum 7 is rotated in the clockwise direction to the initial position P5, thereby to complete recording of one scene.

Figure 6:
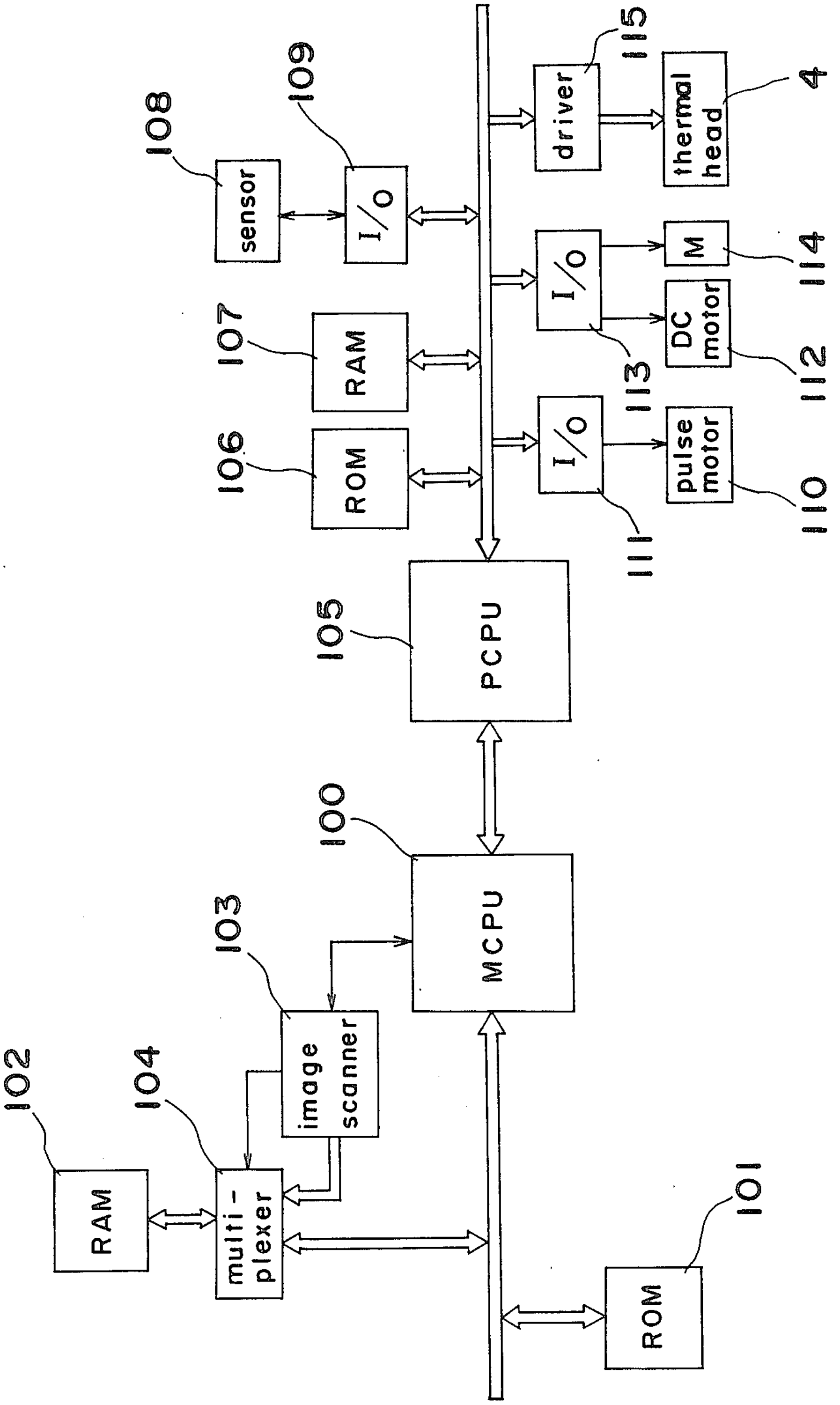
FIG. 6 is a block diagram of a control unit of the color printer of FIG. 1.

FIG. 6 is a block diagram of a control unit of the color printer according to the present invention. A main CPU 100 works in accordance with control programs stored in ROM 101. RAM 102 is used as a working area in performance of the programs by the main CPU 100. RAM 102 further stores image information to be recorded. An image scanner 103 converts image information of color originals, etc. into digital information, with storing the image information in a specific area in the RAM 102. A bus line of the image scanner 103 is switched to a bus line of the main CPU by a multiplexer 104. A sub-CPU 105 controls recording in accordance with control programs stored in ROM 106. Also, a RAM 107 is a memory to be used as a working area when the ROM 106 operates. A sensor 108 includes various sensors such as the paper sensors 3*a* and 3*b*, and the photosensor 30*b* to be described later. I/O 109 is generated so that the condition of these sensors is read in the sub-CPU 105. A pulse motor 110 drives the drum 7 and I/O 111 controls the pulse motor 110 in accordance with the operation of the sub-CPU 105. On the other hand, a DC motor 112 drives the platen 1, and I/O 113 controls the DC motor 112 for normal rotation, reversed rotation or stop of rotation, etc. A motor 114 is provided for driving the paper feeding roller 15 or other driving parts. The thermal head 4 is comprised of heating elements which are arranged in a row in the widthwise direction of the recording paper. A driver 115 drives the thermal head 4 on the basis of recording data generated by the sub-CPU 105. The sub-CPU 105 receives the image information from the main CPU 100 to constitute recording data in a predetermined procedure which data is then outputted to the driver 115.

FIGS. 7(A) to 7(F) are flow-charts each showing the operational procedure of the control part (mainly the operational procedure by the sub-CPU 105). In the case that a fresh information is to be recorded onto the recording paper, the pulse motor 110 is driven a predetermined number of steps from the position indicated in FIG. 1 to be rotated in the clockwise direction. The paper holder member 12 is accordingly opened (n10). Then, the lever 6 is driven in the direction reverse to the F direction so as to separate the thermal head 4 from the platen 1. Further, the guide element 22 is turned horizontal to open the paper feeding passage (n12→n14). Afterwards, the paper feeding roller 15 is rotated one rotation in the clockwise direction (n16→n18). Accordingly, the recording paper is moved in the forward direction through the transferring passages 27 and 28. When one of the paper sensors 3*a* and 3*b* detects the end of the recording paper, a timer is set so as to count time until the other of the sensors 3*a* and 3*b* detects the end of the paper. More specifically, in step n22, when the paper sensor 3*a* (MS1) detects the end of the recording paper, the timer T is set for increment until the paper sensor 3*b* (MS2) detects the end of the recording paper (n24→n26→n28→n30→n26). In this case, it is determined whether the value indicated by the timer T exceeds a prearranged permissible range Tm. Therefore, if the value of the timer T exceeds the permissible range before the paper sensor MS2 detects the end of the paper, when the transfer of the paper is stopped, and it is indicated that the recording paper is transferred out of balance (n32→n34). On the contrary, in the case that the paper sensor MS2 detects the end of the recording paper earlier than the sensor MS1, the timer T is set for increment until the paper sensor MS1 detects the end of the recording paper (n38→n40→n42→n44→n40). Similarly, if the value of the timer T exceeds the permissible range Tm before the detection by the paper sensor MS1, the transfer of the recording paper is stopped, with doing the same error display as in the above case (n44→ⓧ→n32→n34). This permissible range Tm is set, for example, to be the value corresponding to that when the end of the recording paper at opposite ends is slipped 0.5 mm from each other. It is to be noted here that the value Tm may be variable.

Figure 7A:
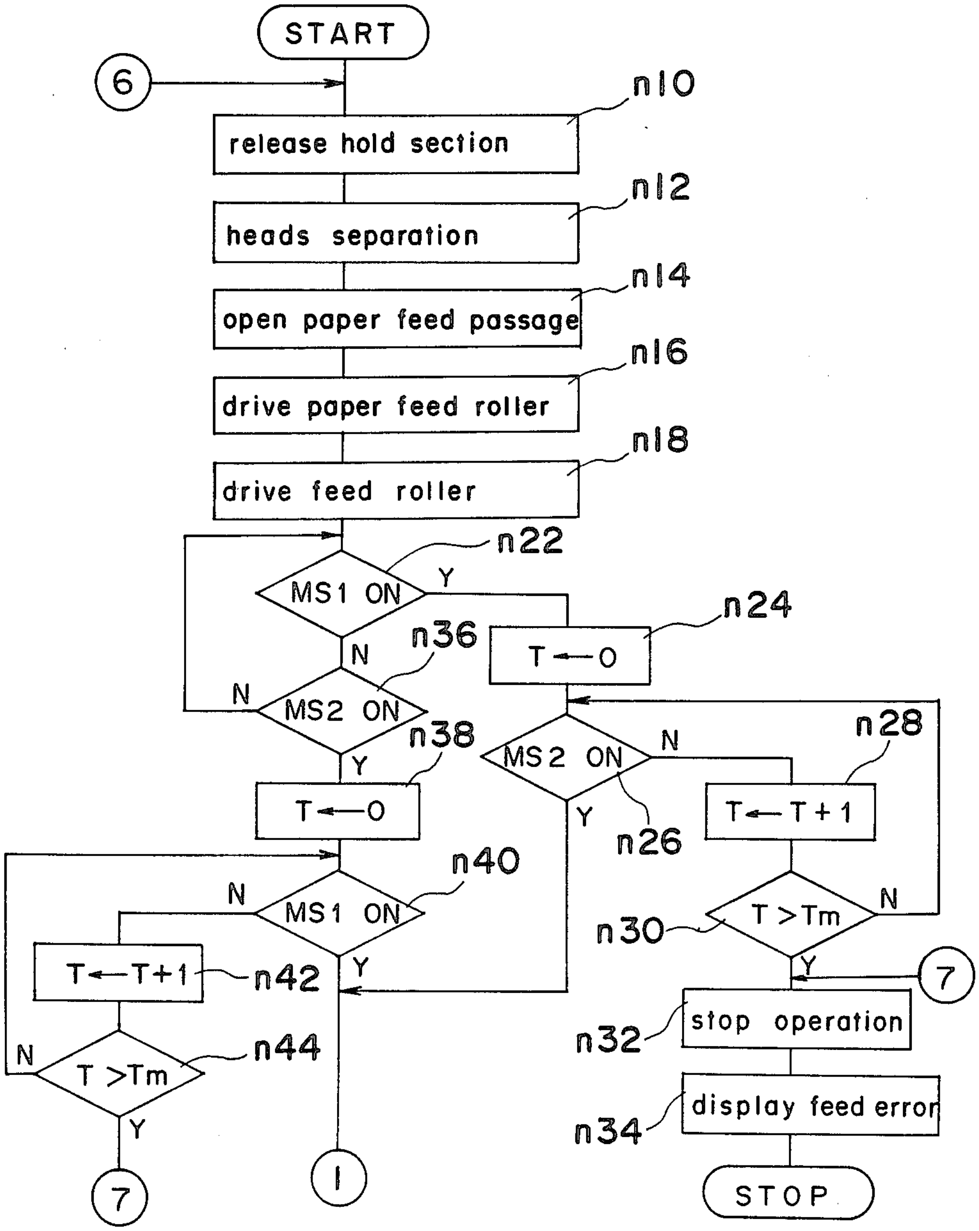
FIGS. 7(A) to 7(F) are flow-charts each showing the operational sequence of the control unit of FIG. 6.
Figure 7B:
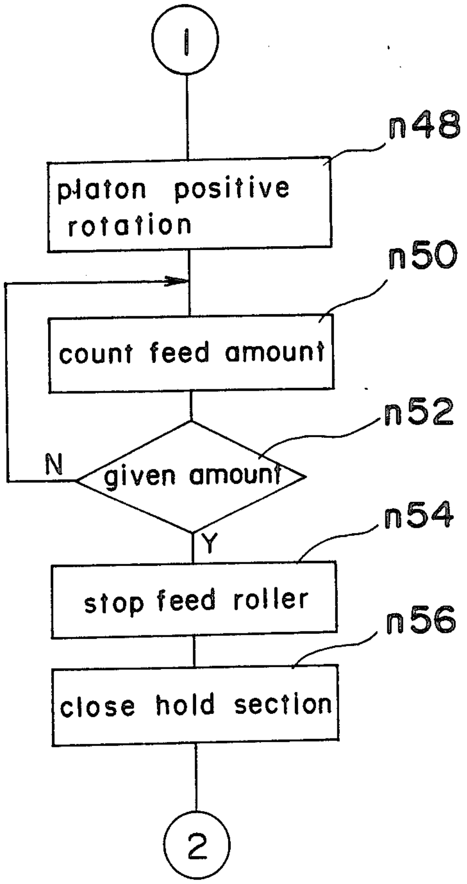

When the value of the timer until one of the paper sensors 3*a* or 3*b* detects the end of the recording paper since the other of the paper sensors detects the end of the recording paper is within the permissible range, the recording paper is forwarded a predetermined distance by the platen 1 and stopped there (n48→n50→n52→n54), as shown in FIG. 7(B). In the manner as described above, after the end of the recording paper is sent to the paper holder member 12, the paper holder member is closed, through clockwise rotation of the drum 7, so as to hold the end of the recording paper (n56).

Figure 7C:
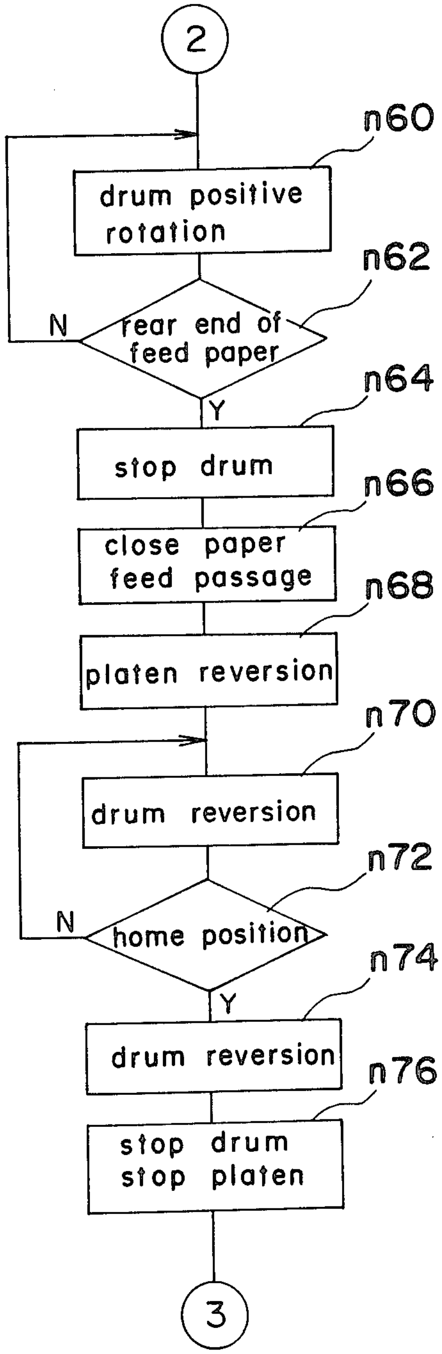

As shown in FIG. 7(C), the drum 7 is still rotated in the clockwise direction until the rear end of the recording paper is detected by the paper sensors 3*a* and 3*b* (n60→n62). The recording paper is wound around the drum 7 until the rear end of the recording paper comes to the position of the paper sensors 3*a* and 3*b*, when the drum 7 is stopped. At this time, the guide element 22 is rotated as shown in FIG. 1, to open the transferring passages 28 and 23 (n64→n66). In this condition, with the platen 1 being applied with rotational torque in the reverse direction, the drum 7 is rotated in the counterclockwise direction up to the home position, thereby rewinding the recording paper (n68→n70→n72). The home position of the drum is detected in such manner as shown in FIG. 1 that the photosensor 30*b* detects a light-shield 30*a* provided in the inner surface of the drum 7. The drum 7 continues to be rotated a predetermined number of steps in the counterclockwise direction even after passing through the home position. Then, the drum 7 and the platen 1 are stopped (n74→n76). As is described hereinabove, since the recording paper is so arranged, according to the present invention, as to be returned to its initial position without any information recording thereon, the recording paper can be removed without deflections.

Figure 7D:
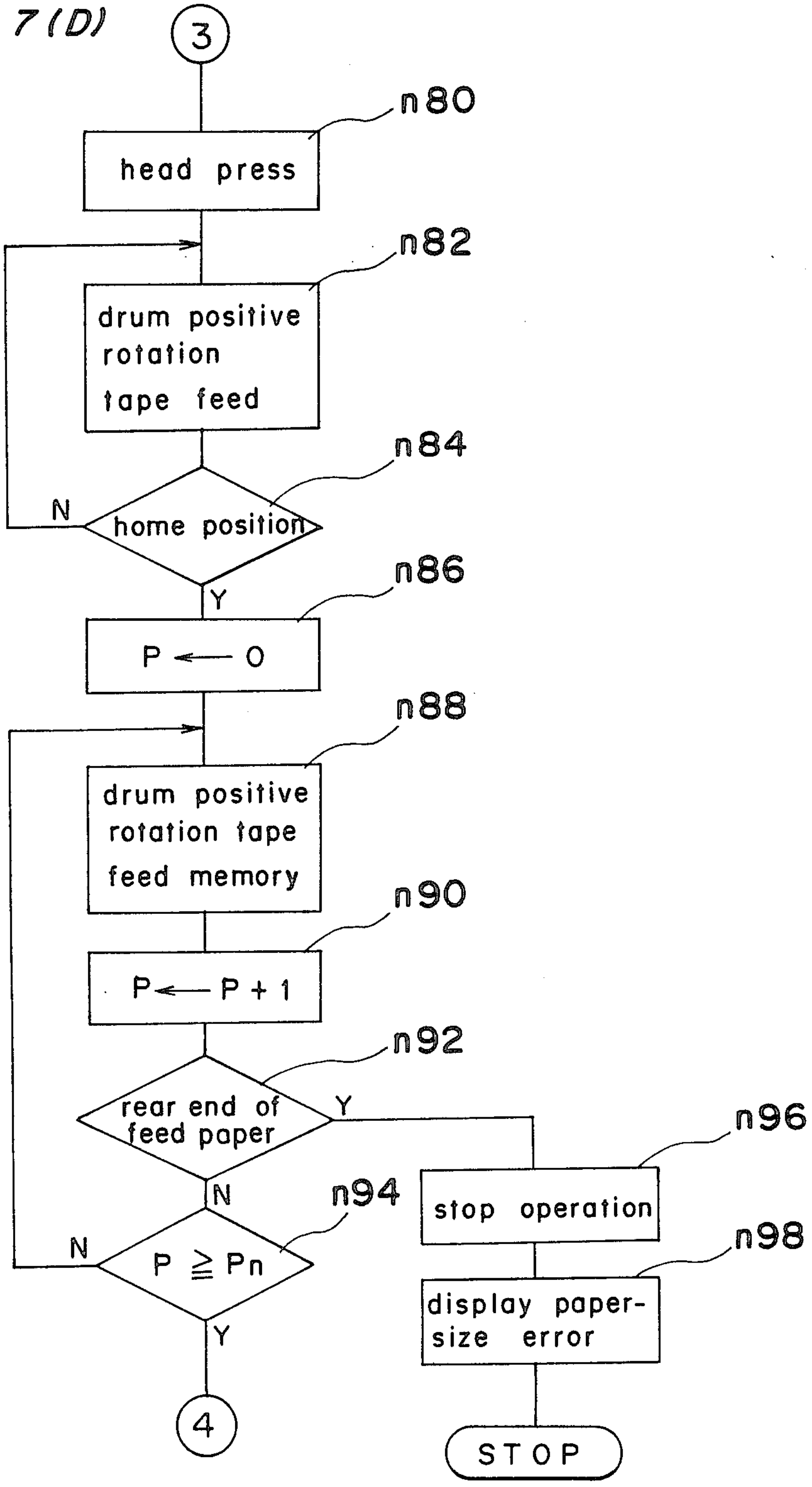

Then, as shown in FIG. 7(D), while the thermal head 4 is pressed against the platen 1, the drum 7 is rotated in the clockwise direction to the home position, and simultaneously the ink film tape is forwarded (n80→n82→n84→n82). When the drum 7 reaches the home position, a counter P which counts the number of steps of the pulse motor 110 is set. The ink film tape is sent out simultaneously with the clockwise rotation of the drum, and the thermal head 4 is driven (n86→n88). The aforementioned sequence of operations is repeated until the counter P indicates the number of pictures Pn corresponding to the length of a scene to be recorded in the forwarding direction of the recording paper (n88→n90→n92→n92→n94→n88). In step n92, it is determined whether the paper sensors 3*a* and 3*b* detect the rear end of the recording paper. Therefore, if the rear end of the recording paper is detected by the sensors 3*a* and 3*b* before the scene to be transcribed is completely finished, the transcription is interrupted, and at the same time it is indicated that the recording paper is not correct in size (n96→n98).

Figure 7E:
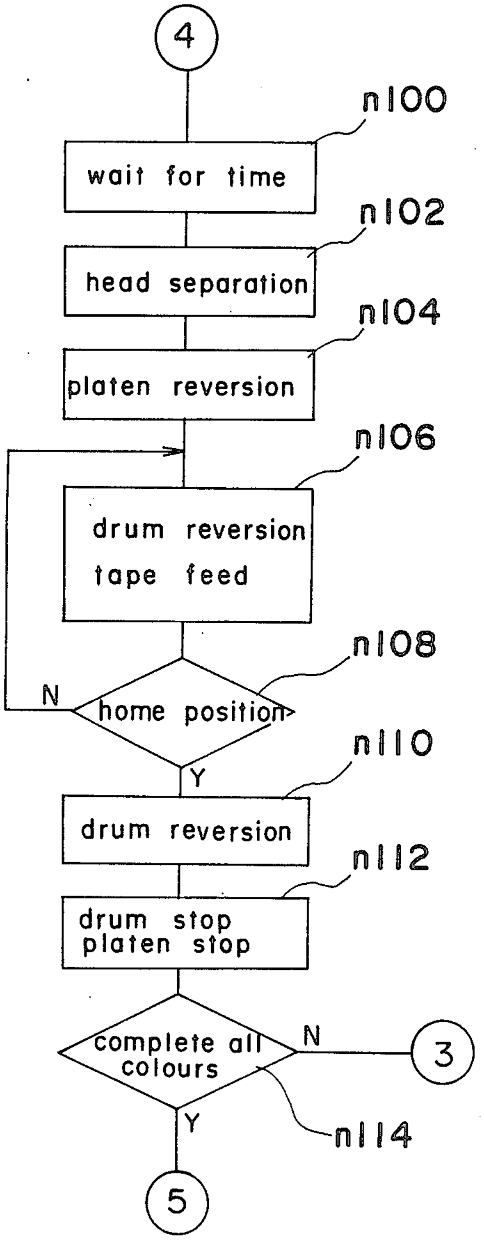

After the recording paper is wound around the drum 7 to be transcribed, as shown in FIG. 7(E), a predetermined period of time passes for completely fixing the ink transcribed just before. Then, the thermal head 4 is separated from the platen 1 and the platen 1 is applied with rotational torque in the reverse direction (n100→n102→n104). Subsequently, the drum 7 is rotated in the counterclockwise direction to the home position so as to rewind the recording paper. At this time, the ink film tape is forwarded in preparation for a next transcription (n106→n108). The drum 7 and the platen 1 are stopped after the drum 7 is rotated in the counterclockwise direction, passing through the home position, to a predetermined position (n110→n112). Thus, the color printer is returned to the initial state for a next transcription.

A colored image can be thus recorded on the recording paper by performing the above-described sequence of operations each for the four colors, with the use of the ink film tape which is constituted by four colors Y, M, C, B, Y, M, . . . sequentially (n114→③→n80).

Figure 7F:
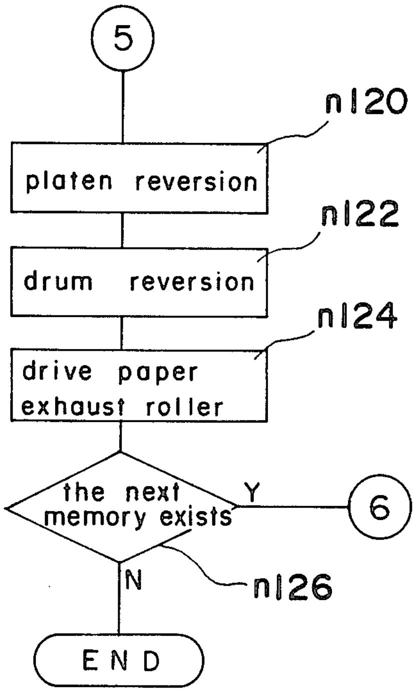

After completion of the transcription of all colors, the platen 1 is applied with rotational torque in the reverse direction, as indicated in FIG. 7(F), thereby to rotate the drum 7 in the counterclockwise direction. Furthermore, the paper discharging rollers 24 and 25 are driven to discharge the recording paper 9 wound around the drum 7 through the transferring passages 28 and 23 to the discharge tray 26 (n120→n122→n124). Thus, the colored image is recorded on the recording paper. For recording a second recording paper, the above-described procedures should be repeated (n126→n10).

As is described hereinabove, according to the present invention, the recording paper can be positioned accurately at the starting position, and therefore no slippage is brought about in the color printer of the present invention.

In addition to the accurate positioning of the recording paper at the starting position, the color printer of the present invention enables the recording paper to be correctly reciprocated. Therefore, a colored image can be transcribed without slippage of colors. Moreover, since it is so designed that the ends of the recording papers are correctly transferred, with no excess or no deficiency, to the paper holder member, the ends of the papers can be securely held by the holder member. Accordingly, there are no possibilities for slippages, wrinkles or deflections to be brought about on the recording papers during the transfer of the papers.

Further, owing to such structure of the color printer that the rotary drum is driven by the pulse motor and the platen is rotated by the DC motor which is a non-pulse motor or a non-synchronous motor, the recording paper is applied with tensile force by the platen and at the same time, the rotary drum is rotated at constant speed, and therefore, the recording paper can be transferred in the returning direction without any deflections.

Although the DC motor is employed for driving the platen in the foregoing embodiment, any motor will do if only it can transfer the recording papers with load, and can generate such rotational torque as not to bring the rotary drum out of order.

Even in the case that recording papers of a smaller size are erroneously inserted in the color printer of the present invention, the recording papers can be discharged out of the printer easily since the rear ends of the recording papers are never detached from the platen.

In the present embodiment, the recording operation is interrupted when the paper sensors detect the rear end of the recording paper during the transfer of the paper. However, such interruption may be arranged when the paper sensors detect the rear end of the recording papers while the recording paper is returned emptily with no information being recorded. In other words, it can be that when the paper sensors detect the rear end of the recording paper before the rotary drum is rotated drum is rotated a predetermined amount of rotation during the empty transfer, the empty transfer of the recording paper is interrupted, and also it is indicated that the paper size is not correct.

In such case as in the present embodiment where the recording paper is reciprocated many times between the platen and the drum, it is particularly important that the recording paper be transferred in an aligned condition. In view of this, the color printer of the present invention is advantageous in that it can avoid an abnormal transfer of the recording papers because the balance of the recording papers is detected before the papers are transferred by the platen 1 and the bail roller 2.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A recording apparatus comprising:

a recording head for selectively recording material on recording paper;

winding means for reciprocating said recording paper so as to permit recording of information by said recording head, said winding means having a gripper for selectively engaging an end portion of said recording paper, said winding means reciprocating said recording paper in a winding direction and a rewinding direction; and means for controlling reciprocation of said winding means and for permitting selective recording by said recording head, said means for controlling causing said recording paper to be engaged by said gripper and thereafter being moved in the winding direction without having any information recorded thereon by said recording head during an initial winding, said means for controlling thereafter moving said recording paper in said rewinding direction and then again moving said recording paper in said winding direction while permitting said recording head to record material on said recording paper as said recording paper is moving in said winding direction whereby said initial winding aids in preventing stress and wrinkles being formed in said recording paper.

2. A recording apparatus comprising:

a recording head for selectively recording material on recording paper;

a platen located opposite said recording head such that said recording paper passes between said recording head and said platen being selectively driven;

transfer means for reciprocating said recording paper in a forward and rearward direction, said transfer means being selectively driven and moving said recording paper between said recording head and said platen, said transfer means being located to a first side of said recording head and said platen;

a paper detection sensor located to a second side of said recording head and said platen, said first side being opposite said second side and said recording paper first passing through said second side as said recording paper is initially moved in said forward direction, said paper detection sensor detecting a rear end of said recording paper; and control means for synchronizing driving of said platen and said transfer means such that said recording paper is in tension during movement, said control means further determining when said rear end of said recording paper is proximate to said second side of said recording head due to detection by said paper detection sensor, said control means thereafter prevent continued movement of said recording paper in said forward direction and causing said transfer means to move said recording paper in said rearward direction such that said paper remains between said recording head and said platen until said recording paper is discharged in the rearward direction.

3. The recording apparatus as recited in claim 2, wherein said control means further determines whether a complete recording of material has been completed for a forward movement of said recording paper and further interrupts recording by said recording head if said paper detection sensor detects a rear end of said recording paper before completion of said recording whereby recording paper improperly sized for a particular recording of material can be detected.

4. A recording apparatus comprising:

a recording head for selectively recording material on recording paper;

a platen located opposite said recording head such that said recording paper passes between said recording head and said platen, said platen being selectively driven;

transfer means for reciprocating said recording paper in a forward and rearward direction, said transfer means being selectively driven and moving said recording paper between said recording head and said platen, said transfer means being located to a first side of said recording head and said platen, said transfer means including a gripper for gripping the recording paper, said gripper being movable between an opened and closed position in response to forward and rearward movement of said transfer means;

a paper detection sensor located to a second side of said recording head and said platen, said first side being opposite said second side and said recording paper first passing through said second side as said recording paper is initially moved in said forward direction, said paper detection sensor detecting a front end of said recording paper; and control means for synchronizing driving of said platen and said transfer means such that said platen is driven to move said recording paper in a forward direction before said transfer means is moved in a forward direction sufficient to close said gripper such that the front end of said recording paper will reach the transfer means and be gripped thereby whereafter the transfer means and platen will both be driven in the forward direction.

5. A recording apparatus comprising:

a recording head for selectively recording material on recording paper;

a platen for pressing said recording paper against said recording head, said recording paper passing between said recording head and said platen;

a nonpulse motor for driving said platen in at least a forward and rearward directions;

transfer means for gripping said recording paper and for reciprocating said recording paper in said forward and rearward directions, said transfer means being located to a side of the recording head;

a pulse motor for driving said transfer means in said forward and rearward directions;

pulse generating means for generating pulses in response to driving of said transfer means by said pulse motor;

control means for synchronizing driving by said nonpulse motor and said pulse motor such that said recording paper is retained in tension when gripped by said transfer means such that strains or deflections are avoided in said recording paper, said control means receiving said pulses generated by said pulse generating means and using said pulses in said synchronizing.

6. A recording apparatus comprising:

a pivotable recording head for selectively recording material on recording paper, said recording head being pivotable between a first position wherein said head is in engagement with said recording paper and a second position wherein said head is out of engagement with said recording paper;

transfer means for reciprocating said recording paper in a forward and rearward directions, said transfer means being selectively driven and being located to a forward side of said recording head;

control means for controlling the pivoting of said head, the recording by said head and the driving of said transfer means, said control means permitting said recording head to record said material on said recording paper as said recording paper is moved at least in one of said forward and rearward directions, said control means further delaying changes in direction of movement of said recording paper and changes in the position of said recording head for a predetermined period of time such that said material recorded on said recording paper will be affixed thereto and will avoid blurring of said material, said control means pivoting said recording head to the first position before any material is recorded on said recording paper and pivoting said recording head to said second position at least after completion of recording of all of said material.

7. The recording apparatus as recited in claim 6 wherein said control means further pivots said recording head to said second position during movement of said recording paper in said rearward direction and pivots said recording head to said first position during movement of said recording paper in said forward direction whereby said material is recorded on said paper only when said paper is moved in said forward direction.

8. The recording apparatus as recited in claim 6 wherein said transfer means is located to a forward side of said recording head and further including a platen located opposite said recording head, said recording paper passing between said platen and said recording head during recording of said material.

9. A recording apparatus comprising:

a recording head for selectively recording material on recording paper;

transfer means for reciprocating said recording paper in a forward and rearward direction, said transfer means being selectively driven and causing said recording paper to move over said recording head to permit said recording of material, said transfer means having a gripper for selectively engaging an end of said recording paper;

control means for controlling driving of said transfer means, said control means moving said transfer means from a first position wherein said recording paper is engaged by said gripper to a second, third and fourth positions while said recording paper continuously moves in said forward direction, said control means further moving said transfer means back from said fourth to said third, to at least said second positions while said recording paper continuously moves in said rearward direction, said third and fourth positions corresponding to positions in which initiation and termination of recording of said material on said recording paper occurs while said recording paper is moving at least in said forward direction, said second position being between said first and third positions and being a point where rearward movement is terminated when said recording paper is reciprocated unless said recording paper is to be discharged from said transfer means, said second and said third positions being sufficiently separated to permit deflections formed in said recording paper during movement of said recording paper in said rearward direction to be removed therefrom in order to aid recording by said recording head, said deflections being removed due to forward movement of the recording paper between said second and third positions.

10. The recording apparatus as recited in claim 9 further comprising a second position detection means for providing a signal to said control means when said transfer means reaches said second position, said signal being used by said control means in controlling driving of said transfer means.

* * * * *